July 29, 1952          G. P. LESSMANN          2,605,101
TENSION CONTROL SYSTEM

Filed Oct. 19, 1945          2 SHEETS—SHEET 1

WITNESSES:
E. A. M'Closkey.
F. V. Giolma

INVENTOR
Gerhard P. Lessmann.
BY
L. M. Crawford
ATTORNEY

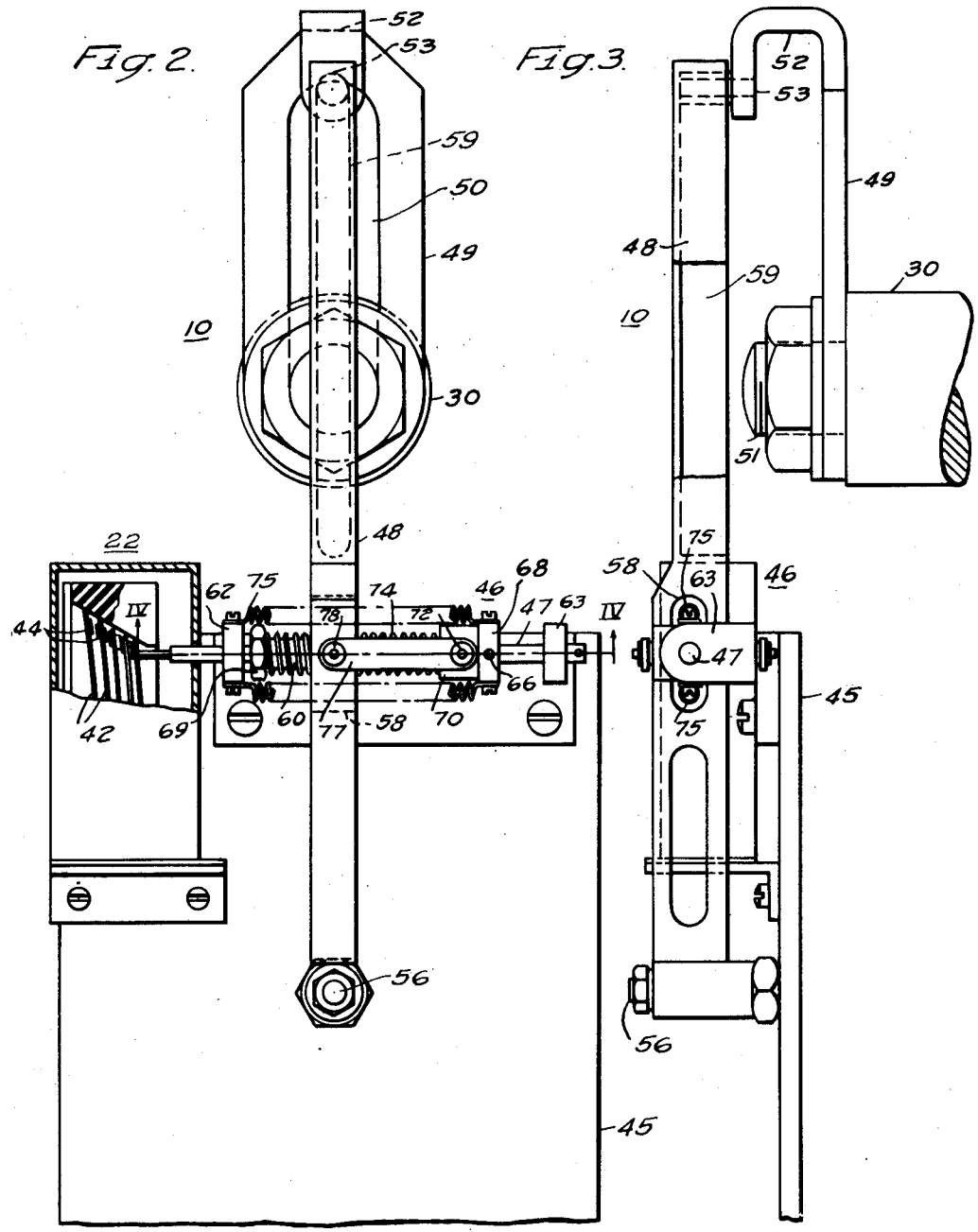

Patented July 29, 1952

2,605,101

UNITED STATES PATENT OFFICE 2,605,101

TENSION CONTROL SYSTEM

Gerhard P. Lessmann, Wilkinsburg, Pa., assignor to Westinghouse Electric Corporation, East Pittsburgh, Pa., a corporation of Pennsylvania Application October 19, 1945, Serial No. 623,338

8 Claims. (Cl. 271—2.3)

My invention relates, generally, to tension control systems, and it has reference in particular to regulating means for tension control systems.

Generally stated, it is an object of my invention to provide a tension control system that is simple and inexpensive to manufacture and is easy to install and operate.

More specifically, it is an object of my invention to provide a simple and practical method for mechanically connecting a pressure-operated regulator to a tension roll in a tensiometer system.

Another object of my invention is to provide for so connecting a mechanical pressure type of resistance regulator to a tensiometer roll shaft that excessive movement of the tensiometer shaft can not damage the relatively delicate regulator.

Yet another object of my invention is to provide for operation of the regulator over its entire range with either full or partial movement of the tensiometer roll.

Still another object of my invention is to provide for so connecting the regulator to the tensiometer roll that movement of the tensiometer roll in either direction may be used, with the choice of either applying pressure to the regulator or releasing it.

It is also an object of my invention to provide for connecting a mechanical pressure type regulator to a tensiometer roll without any backlash between the tensiometer roll and the regulator.

A further object of my invention is to provide for simplifying tensiometer control systems by providing a flexible mechanical connection for operating a regulating device in response to movement of the tensiometer roll. Other objects will in part be obvious and will, in part, be explained hereinafter.

According to my invention, the flexible contact members of a stack of spring contacts in a regulator of the mechanical pressure type, which are connected at spaced intervals to a resistance element, are pressed into circuit making connection by a regulator rod which is slidably mounted and is connected to a pivoted lever through a spring connection. The lever is operatively connected to the tensiometer shaft by a radially extending crank arm which is connected to the tensiometer shaft, and is provided with a pin which fits into an elongated slot in the pivoted lever. The crank arm is adjustably connected to the shaft so that both its effective length and the direction of actuation of the lever for a given movement of the shaft may be varied.

For a more complete understanding of the nature and scope of my invention, reference may be made to the following detailed description which may be studied in connection with the accompanying drawings, in which:

Fig. 2 is an enlarged front elevational view of the flexible connection between the tensiometer shaft and the regulator;

Fig. 3 is an enlarged side elevational view of the connecting means shown in Fig. 2.

Figure 1:
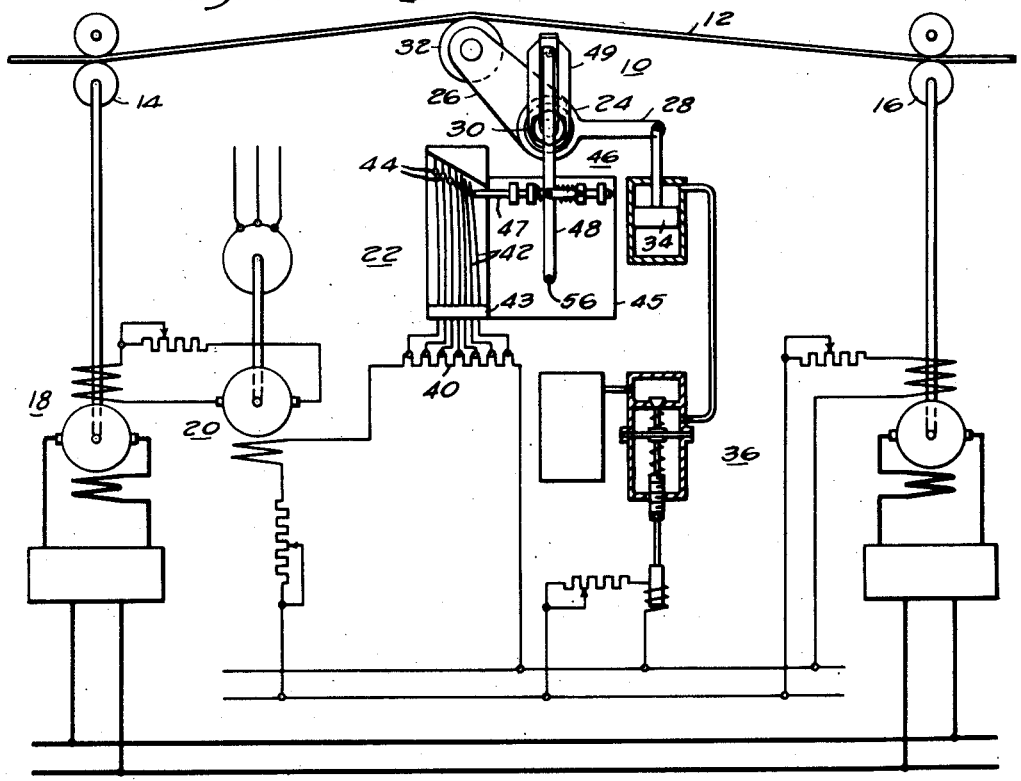
Figure 1 is a diagrammatic view of a tension control system embodying the invention in one of its forms.

Referring to Fig. 1, the tension control system shown therein may be substantially similar to that shown and described in Patent No. 2,223,718, which issued on December 3, 1940 to W. G. Cook, wherein a tensioning device 10 is disposed to deflect a strip of material 12 from its normal passline as it passes in the direction of the arrow between the adjacent roll stands 16 and 14. The tensioning device 10 functions to maintain a desired tension on the strip 12 within a predetermined range of strip deflection. The deflection of the strip 12 by the tension device 10 is kept within the desired range by speed control of the drive motor 18 for the roll stand 14. The speed of the drive motor may be controlled by means of an exciter generator 20, which may be controlled by a regulator 22, which is disposed to be actuated in accordance with the variations in the deflection of the strip 12 by the tensioning device 10.

The tensioning device 10 may comprise a bell crank 24 having arms 26 and 28 pivotally mounted on a shaft 30. A tension roll 32 is rotatably mounted on the arm 26 to bear against the strip 12 in order to tension it. A piston 34 acts on the bell crank arm 28 under the influence of fluid pressure which may be maintained by a regulating valve 36.

The regulator 22 may be of the mechanical pressure type, comprising a resistance element 40 having a plurality of flexible contact arms 42 connected thereto at spaced intervals. The contact arms 42 may be clamped at one end in a block of insulation 43, and provided with suitable contacts 44 adjacent the free ends which are normally in spaced relation, but which may be pressed or actuated into circuit making engagement to progressively short circuit different sections of the element 40.

In order to provide for actuating the contact members 42 of the regulator 22, in response to movement of the tension roll 32, connecting means 46 may be provided on a base 45 on which the contact arms 42 may be mounted, as shown in Fig. 2, for operatively connecting the tensiometer shaft 30 to actuate the contact members 42.

Referring to Figs. 1 through 4, it may be seen that the connecting means 46 may comprise, generally, a contact actuating regulator rod or pin 47 which may be resiliently connected to a pivotal lever 48, which has an operating connection with a crank arm 49 which is adjustably connected to the tensiometer shaft 30, as will now be described in detail.

Referring particularly to Figs. 2 and 3, it will be seen that the crank arm 49 may comprise a plate having a slot 50 therein for adjustably positioning the arm on a threaded extension 51 of the tensiometer shaft 30. The outer end of the arm may be provided with a U-shaped extension 52, having a pin 53 projecting therefrom, for affecting an operative connection with the lever 48.

The lever 48 may comprise an elongated bar pivotally supported at the lower end on the support base 45 by means of a stud bolt 56. An elongated opening 58 may be provided transversely of the lever intermediate its ends for receiving the regulator rod 47. Adjacent the end of the lever, remote from the pivotal support, an elongated groove 59 may be provided in the side adjacent the tensiometer shaft for receiving the pin 53 on the radial crank arm 49.

Figure 4:
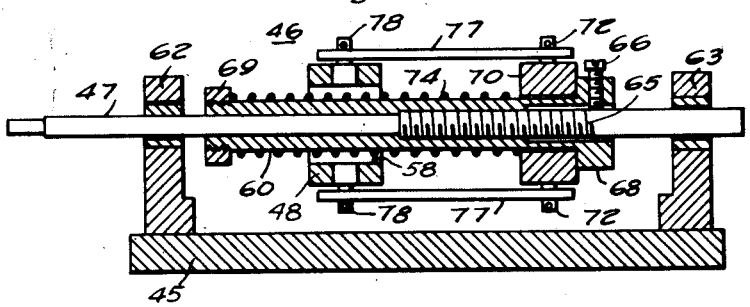
Fig. 4 is a further enlarged sectional view taken along the line IV—IV of Fig. 2.

In order to provide a flexible connection between the lever 48 and the regulator rod 47, a sleeve 60 may be secured on the rod 47 intermediate and in spaced relation between a pair of spaced supports 62 and 63, wherein the rod may be slidably mounted, as shown in Figs. 2 and 4. The supports 62 and 63 are carried by the support base 45. The sleeve 60 may be internally threaded to engage threads 65 on an enlarged section of the regulator rod 47 for adjustably positioning the sleeve relative to the ends of the rod. A set screw 66 may be provided for firmly locating the sleeve on the rod. A sleeve shoulder 68 may be provided on the end of the sleeve 60 remote from the regulator 22, and this shoulder 68 may be integral with the sleeve. A second sleeve shoulder 69 may be provided adjacent the other end of the sleeve 60, being threadedly connected thereto. Between the two shoulders 68 and 69, a slidable collar 70 is positioned on the sleeve 60, this collar having oppositely disposed pins 72 projecting therefrom. A compression spring 74, capable of exerting a force only slightly greater than the force required to affect circuit making engagement of the contacts 44 of the regulator, is positioned on the sleeve between the sleeve shoulder 69 and the slidable collar 70. Means, such as a pair of tension springs 75 (Fig. 2), are connected between a support, such as 62, and the sleeve collar 68 of the regulator-pin 47, so as to take up all backlash between said regulator-pin and the tensiometer-roll 32, the tensiometer crank-arm 49 being adjusted so as to normally maintain the regulator rod 47 in contact with the nearest one of the contact members 42 of the regulator 22, at a desired minimum tension of the strip 12. The slidable collar 70 may be operatively connected to the lever 48 by means of links 77 connecting the pins 72 of the slidable collar to pins 78 on the lever.

In operation the tension springs 75 normally maintain the operating rod 47 in contact with the first of the flexible contacts of the regulator 22, so as to prevent any backlash. The position of the sleeve 60 on the regulator rod 47 may be adjusted to provide suitable clearances between the sleeve and the supports 62 and 63. Movement of the tension roll 32 is transmitted to the regulator 22 by the radial crank arm 49 pivoting the lever 48 about its support pin 56. Movement of the lever 48 is transmitted to the slidable collar 70, and thence to the contact actuating regulator rod 47 through the compression of the coil spring 74. The amount of the resistance 40 in the field circuit of the exciter 20 of the motor is thus regulated, and the operation of the motor 18 may thus be controlled in response to movement of the tension roll 32 to maintain a predetermined tension in the strip 12.

Since the radial arm 49 is adjustable, both as to its angular relation and as to its radial length, full compression of the stack of flexible contact members of the regulator can be affected with full or partial travel of the tension roll. Thus, the full range of the regulator is available for any range of movement of the tension roll.

Since the radial arm 49 may be operatively reversed, through a substantially 180° angular adjustment on the tensiometer shaft 30, so that the pin 53 engages the lever 48 either above or below the axis of the tensiometer shaft 30, movement of the roll in either direction may be used, with a choice of using this movement to either compress or release the flexible contact members of the regulator. By adjustably positioning the sleeve 60 on the contact actuating rod 47, the sleeve collar 69 or the associated end of the sleeve 60 may be used as a stop in connection with the fixed support 62 for limiting movement of the contact actuating regulator rod 47, thereby protecting the relatively delicate contact members 44 of the regulator 22 from damage due to excessive movement of the tensiometer roll. At the same time, I avoid subjecting the connecting means to undue strains, since the compression spring 74 yields and permits the operating lever 48 to continue moving after the regulator-pin 47 has been operated as far as it will go. When the roll 32 moves in the opposite direction the collar 70 first moves up against the shoulder 68, and then the sleeve 60 and the regulator rod 47 move with the collar against the pull of the springs 75 so as to accommodate a wide range of roll movement.

From the above description and the accompanying drawings, it will be apparent that I have provided in a simple and effective manner for mechanically connecting a regulator of the mechanical pressure flexible contact type to a tensiometer roll. By means of my invention, a safe and flexible connection is afforded which is simple and inexpensive to manufacture and is easy to install. Lost motion of the connecting means is entirely eliminated, and a wide range of operating positions of the tensiometer roll may be readily accommodated without the possibility of any damage to the regulating means.

Since certain changes may be made in the above-described construction and different embodiments in the invention may be made without departing from the spirit or scope thereof, it is intended that all the matter contained in the above description and shown in the accompanying drawings shall be considered as illustrative and not in a limiting sense.

I claim as my invention:

1. The combination in a tensiometer system for a strip of material between two work devices, of a tension roll disposed between the devices movable to apply a transverse pressure to said material, control means for varying the relative speed of the work devices, and operating means including a crank-arm, means for actuating the crank-arm in response to movements of the tension roll, said crank-arm being adjustable to different angular positions including a substantially 180° reversal, and means for communicating the movements of said crank-arm to said control means.

2. For use with regulating means for varying the relative speed of work devices between which a strip of material travels, a tensiometer roll movable to apply a transverse force to the strip between the work devices, a regulator-operating member for said regulating means, means for limiting the amount of actuating-movement of said regulator-operating member to protect said regulating means against excessive operation, and mechanical connection-means for mechanically communicating the movements of said tensiometer roll to said regulator-operating member, said mechanical connection-means including a spring capable of transmitting slightly more than the required operating force for the regulating means, said spring permitting a continued movement of said tensiometer roll after said regulator-operating member has reached the limit of its actuating-movement.

3. For use in regulating the tension in a strip of material tensioned between two work devices by a movable tension roll, a multi-position, limited-movement, regulating means for varying the relative speeds of the work devices, a regulator-operating member for said regulating means, mechanical connection-means adapted to mechanically communicate the movements of said tension roll to said regulator-operating member, said mechanical connection-means having backlash in such manner that the tension roll can still move after the regulator-operating member has been operated as far as it will go, and resilient means for so biasing said regulator-operating member as to take up said backlash at the beginning of the movement of the regulator-operating member.

4. A tension system for a strip of material extending between two work devices comprising a tensiometer roll, means including a shaft and a radial arm movably supporting the roll between the work devices to apply a transverse force to the strip, regulating means including a resistance element connected for controlling the relative speed of the work devices and having a plurality of normally spaced flexible contact members connected at one end to the resistance element and having the other end free, a radial arm connected to the tensiometer shaft and adjustable to different angular positions and different radial lengths, a lever pivoted adjacent one end and having an adjustable connection with the radial arm adjacent the other end, and means including a rod actuable to actuate the free ends of the contact members into engagement and means resiliently connecting the lever and the rod for actuating the contact members in response to movement of the tensiometer roll.

5. For use in controlling the relative speed of two work devices between which a tensiometer roll is supported by a shaft rotatable to deflect a strip of material extending between the work devices, regulating means actuable to vary the speed of one of the devices, means including a pivoted lever and a radial arm attached to the shaft and operatively connected to the lever, a longitudinally movable rod having a fixed shoulder arranged to actuate the regulating means, and means operatively connecting the rod and lever including a slidable collar on the rod and a spring between the collar and fixed shoulder, said collar being connected to the lever.

6. For use in operatively connecting a regulating device to a tensiometer shaft in a tensiometer system, an arm constructed and arranged to be adjustably connected to the tensiometer shaft in different angular relations thereto and provided with a pin at one end which may be positioned at different distances radially of the shaft, a lever pivoted about a support at one end and provided with an elongated recess intermediate the support and the other end for receiving the pin on the arm, a rod slidably mounted for actuating the regulating device, and means resiliently connecting the rod and lever including a shoulder on the rod, a collar connected to the lever and slidable on the rod, and a spring positioned about the rod between the collar and the shoulder.

7. For use in actuating the free ends of spaced flexible contact members arranged to short circuit different sections of a resistance element in response to predetermined movement of a tensiometer roll mounted on a shaft, an elongated arm having a pin adjacent one end and provided with a longitudinal slot for effecting adjustable attachment to the end of the tensiometer shaft in different angular and radial positions, an elongated lever adjacent the end of the shaft having a pivotal support at one end to provide for movement of the lever in a plane perpendicular to the axis of the shaft, said lever having an opening intermediate the ends transversely of the axis of the shaft and an elongated recess in the side adjacent the shaft for receiving the pin on the arm, a rod positioned in the opening in the lever and slidably mounted for longitudinal movement to actuate the flexible contact members, a fixed collar on the rod on one side of the lever, a slidable collar positioned on the rod on the side of the fixed collar adjacent the lever and connected to the lever, and resilient means interposed between the fixed and slidable collars.

8. For use in actuating in response to movement of a shaft the free ends of spaced flexible contact members fixed at the other ends and connected to an impedance element at spaced points, a rod slidably mounted in spaced supports to actuate the contact members, an elongated sleeve adjustably mounted on the rod between the supports with one end arranged to form a stop for engaging the support adjacent the contact members, a fixed collar on the sleeve adjacent the end next to the contact members, a collar slidable on the sleeve, a coil spring positioned about the sleeve between the collars, a lever having a pivotal support at one end and an opening intermediate the ends for receiving the sleeve and spring, means connecting the lever and the sliding collar in fixed relation, resilient means operatively connecting the slidable collar and the support adjacent the contact members, and a radial arm having a pin at one end disposed to actuate the lever, said arm being adjustably connected to the shaft.

GERHARD P. LESSMANN.

REFERENCES CITED

The following references are of record in the file of this patent:

UNITED STATES PATENTS

| Number | Name | Date |
| --- | --- | --- |
| 2,074,873 | Tytus et al. | Mar. 23, 1937 |
| 2,182,659 | Cook | Dec. 5, 1939 |
| 2,185,836 | Croco | Jan. 2, 1940 |
| 2,221,592 | Lessmann | Nov. 12, 1940 |
| 2,223,718 | Cook | Dec. 8, 1940 |
| 2,345,765 | Michel | Apr. 4, 1944 |